US012664105B2

(12) United States Patent
Punniyamurthy et al.

(10) Patent No.: US 12,664,105 B2
(45) Date of Patent: Jun. 23, 2026

(54) IN-SWITCH EMBEDDING BAG POOLING

(71) Applicant: Advanced Micro Devices, Inc., Santa Clara, CA (US)

(72) Inventors: Kishore Punniyamurthy, Austin, TX (US); Khaled Hamidouche, Austin, TX (US); Brandon K. Potter, Troup, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/478,659

(22) Filed: Sep. 29, 2023

(65) Prior Publication Data

US 2025/0110899 A1    Apr. 3, 2025

(51) Int. Cl.
*G06F 12/02*        (2006.01)
*G06F 13/16*        (2006.01)
*G06N 3/08*         (2023.01)

(52) U.S. Cl.
CPC ...... *G06F 13/1668* (2013.01); *G06F 12/0238* (2013.01); *G06N 3/08* (2013.01)

(58) Field of Classification Search
None
See application file for complete search history.

(56) References Cited

U.S. PATENT DOCUMENTS

| | | |
|---|---|---|
| 6,000,024 A | 12/1999 | Maddox |
| 7,827,385 B2 | 11/2010 | Almasi et al. |
| 8,161,268 B2 | 4/2012 | Faraj |
| 8,752,051 B2 | 6/2014 | Archer et al. |
| 9,432,298 B1 | 8/2016 | Smith |
| 10,608,640 B1 | 3/2020 | Orthner et al. |
| 2009/0327464 A1 | 12/2009 | Archer et al. |
| 2013/0097600 A1 | 4/2013 | Cardona et al. |
| 2013/0304970 A1 * | 11/2013 | Parizi .................... G06F 11/108 |
| | | 711/103 |
| 2015/0106560 A1 | 4/2015 | Perego et al. |
| 2015/0143037 A1 | 5/2015 | Smith |

(Continued)

OTHER PUBLICATIONS

Eisenman, et al., "Bandana: Using Non-Volatile memory for storing deep learning models", (c) 2018.*

(Continued)

*Primary Examiner* — Brian R Peugh
(74) *Attorney, Agent, or Firm* — Kowert, Hood, Munyon, Rankin & Goetzel, P.C.; Rory D. Rankin

(57)        ABSTRACT

An apparatus and method for reducing the memory bandwidth of executing machine learning models. A computing system includes two or more processing nodes, each including at least one or more processors and a corresponding local memory. Switch circuitry communicates with at least the local memories and a system memory of the computing system. The switch includes multiple direct memory access (DMA) interfaces. Each of one or more processing nodes stores multiple embedding rows of embedding tables. A processor of the processing node identifies two or more embedding rows as source operands of a reduction operation. The switch executes memory access requests to retrieve data of the two or more embedding rows from the corresponding local memory, and generates a result by performing the reduction operation. The switch sends the result to the local memory.

20 Claims, 6 Drawing Sheets

(56)                References Cited

U.S. PATENT DOCUMENTS

| | | |
|---|---|---|
| 2015/0370700 A1 | 12/2015 | Sabol et al. |
| 2016/0182154 A1 | 6/2016 | Fang et al. |
| 2016/0344629 A1 | 11/2016 | Gray |
| 2017/0041271 A1 | 2/2017 | Tal et al. |
| 2017/0041304 A1 | 2/2017 | Tal et al. |
| 2017/0041388 A1 | 2/2017 | Tal et al. |
| 2017/0187846 A1 | 6/2017 | Shalev et al. |
| 2017/0212784 A1 | 7/2017 | Johnsen et al. |
| 2018/0074843 A1 | 3/2018 | Smith |
| 2018/0089115 A1 | 3/2018 | Schmisseur et al. |
| 2018/0191523 A1 | 7/2018 | Shah et al. |
| 2019/0073265 A1 | 3/2019 | Brennan et al. |
| 2019/0102171 A1 | 4/2019 | Tashiro et al. |
| 2019/0102346 A1 | 4/2019 | Wang et al. |
| 2019/0303297 A1 | 10/2019 | Fleming, Jr. et al. |
| 2019/0347125 A1 | 11/2019 | Sankaran et al. |
| 2019/0370084 A1 | 12/2019 | Behar et al. |
| 2019/0385057 A1 | 12/2019 | Litichever et al. |
| 2020/0042362 A1 | 2/2020 | Cui et al. |
| 2020/0104275 A1 | 4/2020 | Sen et al. |
| 2020/0137896 A1 | 4/2020 | Elenitoba-Johnson et al. |
| 2020/0151104 A1 | 5/2020 | Yang |
| 2020/0167098 A1 | 5/2020 | Shah et al. |
| 2020/0257517 A1 | 8/2020 | Seater et al. |
| 2021/0084787 A1 | 3/2021 | Weldon et al. |
| 2021/0092069 A1 | 3/2021 | Musleh et al. |
| 2021/0117360 A1 | 4/2021 | Kutch et al. |
| 2021/0133583 A1 | 5/2021 | Chetlur et al. |
| 2021/0232528 A1 | 7/2021 | Kutch et al. |
| 2022/0294848 A1 | 9/2022 | Matthews et al. |

OTHER PUBLICATIONS

International Search Report and Written Opinion of International Application No. PCT/US2024/033415, mailed Oct. 8, 2024, 13 pp.

Amedeo Sapio et al: "Scaling Distributed Machine Learning with In-Network Aggregation", arxiv.org, Cornell University Library, 201 Olin Library Cornell University Ithaca, NY 14853, Sep. 30, 2020 (Sep. 30, 2020), 25 pp.

Bureddy Devendar: "Sharp: In-Network Scalable Streaming Hierarchical Aggregation and Reduction Protocol", Aug. 31, 2020 (Aug. 31, 2020), pp. 1-36, XP055940164, Retrieved from the Internet: URL:https://mug.mvapich.cse.ohio-state.edu/static/media/mug/presentations/20/bureddy-mug-20.pdf [retrieved on Jul. 8, 2022].

Graham, Richard L., et al., "Scalable Hierarchical Aggregation and Reduction Protocol (SHARP)TM Streaming-Aggregation Hardware Design and Evaluation," P. Sadayappan et al. (Eds): ISC High Performance 2020, LNCS 12151, pp. 41-59, 2020. https://doi.org/10.1007/978-3-030-50743-5_3.

* cited by examiner

*Computing System 100*

*Embedding Row Reductions 200*

*Method*
*500*

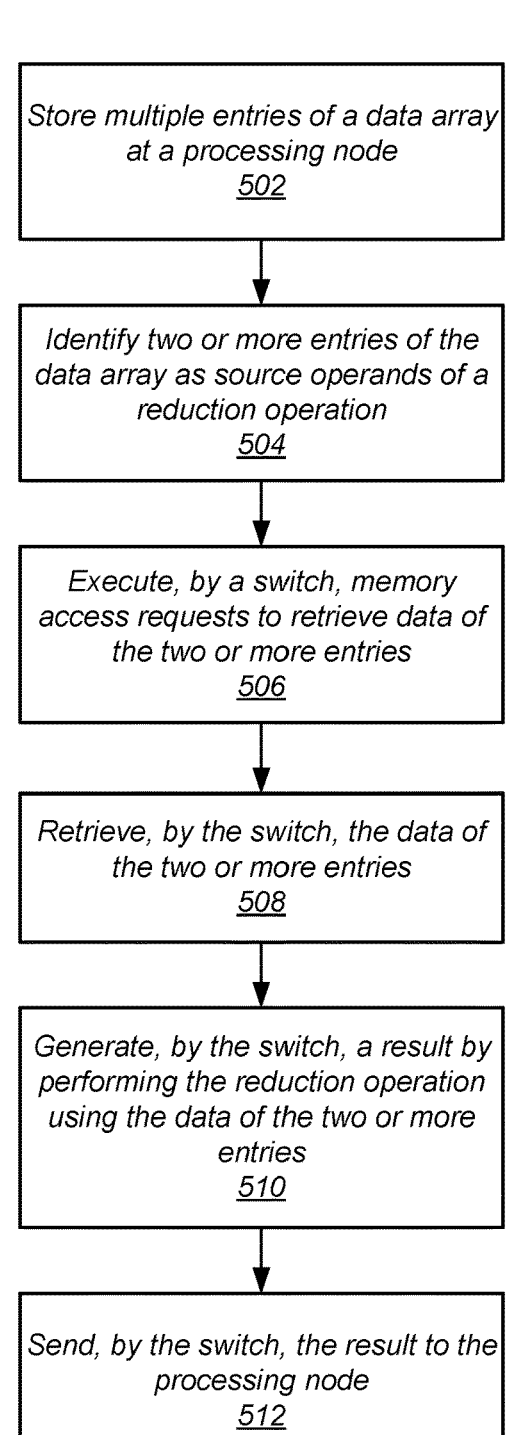

Store multiple entries of a data array
at a processing node
502

Identify two or more entries of the
data array as source operands of a
reduction operation
504

Execute, by a switch, memory
access requests to retrieve data of
the two or more entries
506

Retrieve, by the switch, the data of
the two or more entries
508

Generate, by the switch, a result by
performing the reduction operation
using the data of the two or more
entries
510

Send, by the switch, the result to the
processing node
512

*FIG. 5*

*Method*
*600*

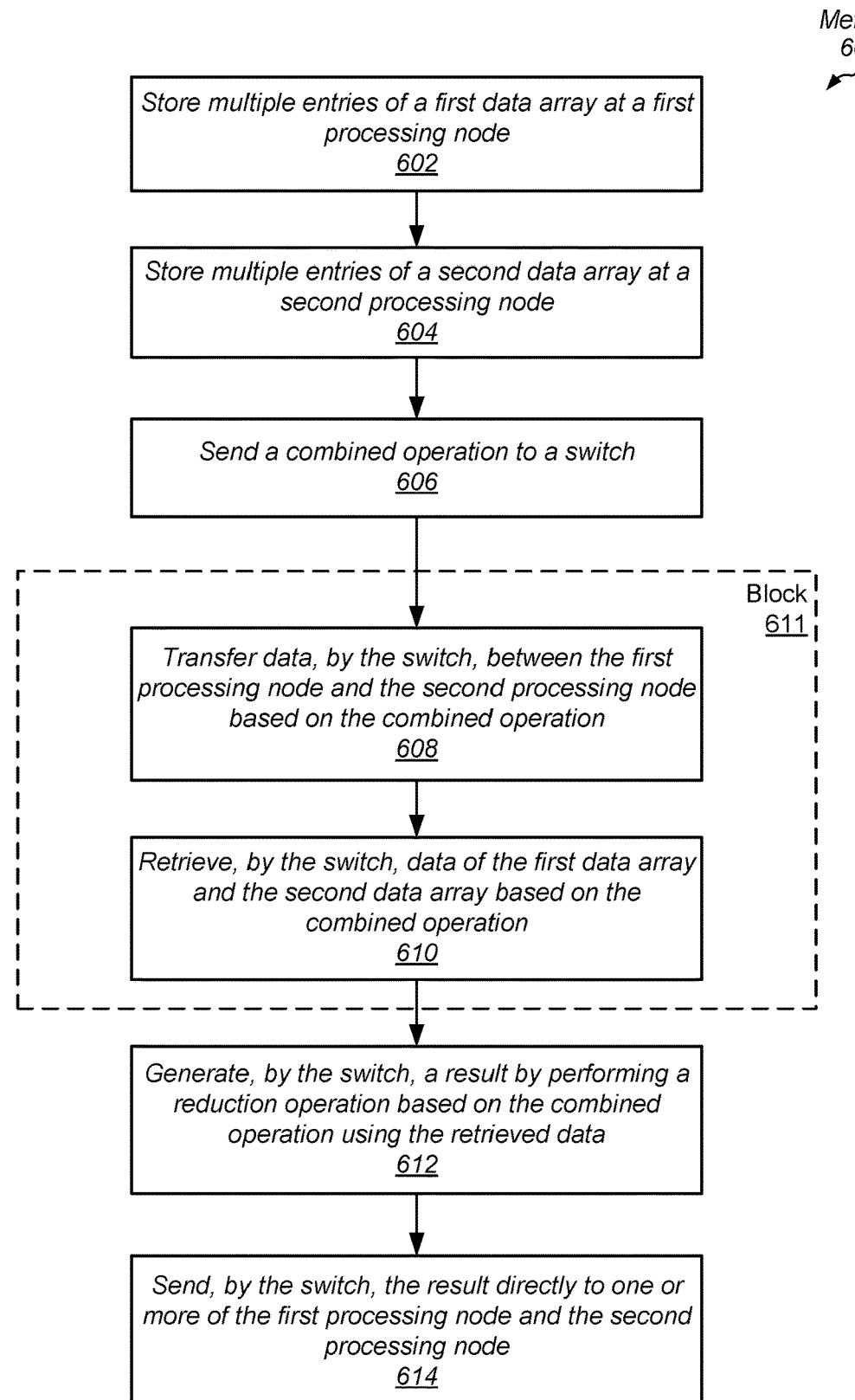

Store multiple entries of a first data array at a first
processing node
*602*

Store multiple entries of a second data array at a
second processing node
*604*

Send a combined operation to a switch
*606*

Block
*611*

Transfer data, by the switch, between the first
processing node and the second processing node
based on the combined operation
*608*

Retrieve, by the switch, data of the first data array
and the second data array based on the
combined operation
*610*

Generate, by the switch, a result by performing a
reduction operation based on the combined
operation using the retrieved data
*612*

Send, by the switch, the result directly to one or
more of the first processing node and the second
processing node
*614*

*FIG. 6*

IN-SWITCH EMBEDDING BAG POOLING

BACKGROUND

Description of the Relevant Art

Neural networks are used in a variety of applications in a variety of fields such as physics, chemistry, biology, engineering, social media, finance, and so on. Neural networks use one or more layers of nodes to classify data in order to provide an output value representing a prediction when given a set of inputs. Weight values are used to determine an amount of influence that a change in a particular input data value will have upon a particular output data value within the one or more layers of the neural network. The cost of using a trained neural network includes providing hardware resources that can process the relatively high number of computations, and can support the data storage and the memory bandwidth for accessing parameters. The parameters include the input data values, the weight values, the bias values, and the activation values.

To increase efficiency, a recommendation system that utilizes a neural network skips the matrix multiplication or other combining operation between the encoded input vector and the first hidden layer, and instead uses a lookup operation of one or more embedding tables. Each entry of an embedding table stores a vector of weights to be used in the first hidden layer. These weights were determined during the training of the neural network. The matrix multiplication or other combining operation is replaced with the lookup operation of the one or more embedding tables. The lookup operation uses the encoded vector as an index. However, as the number of features increase, as the number of users increase, and as the amount of available content (e.g., number of songs for an online music business using a recommendation system) increases, so does the number and size of the embedding tables increase. For example, the number of embedding rows (or rows) in each embedding table can reach multiple millions.

The large number of embedding tables and the large sizes of the embedding tables causes much of the content of the embedding tables to be stored in system memory, rather than in on-die caches. Additionally, memory accesses of the embedding tables typically include irregular memory access operations such that spatial data locality and temporal data locality cannot be used to generate efficient memory accesses. Combining all of these factors causes the memory bandwidth to greatly increase. This increase of the memory bandwidth reduces system performance while increasing power consumption. If an organization cannot support the cost of using the trained neural network, then the organization is unable to benefit from the trained neural network.

In view of the above, efficient methods and apparatuses for reducing memory bandwidth of executing machine learning models are desired.

BRIEF DESCRIPTION OF THE DRAWINGS

FIG. 5 is a generalized diagram of a method that reduces memory bandwidth of executing machine learning models.

FIG. 6 is a generalized diagram of a method that reduces memory bandwidth of executing machine learning models.

Figure 1:
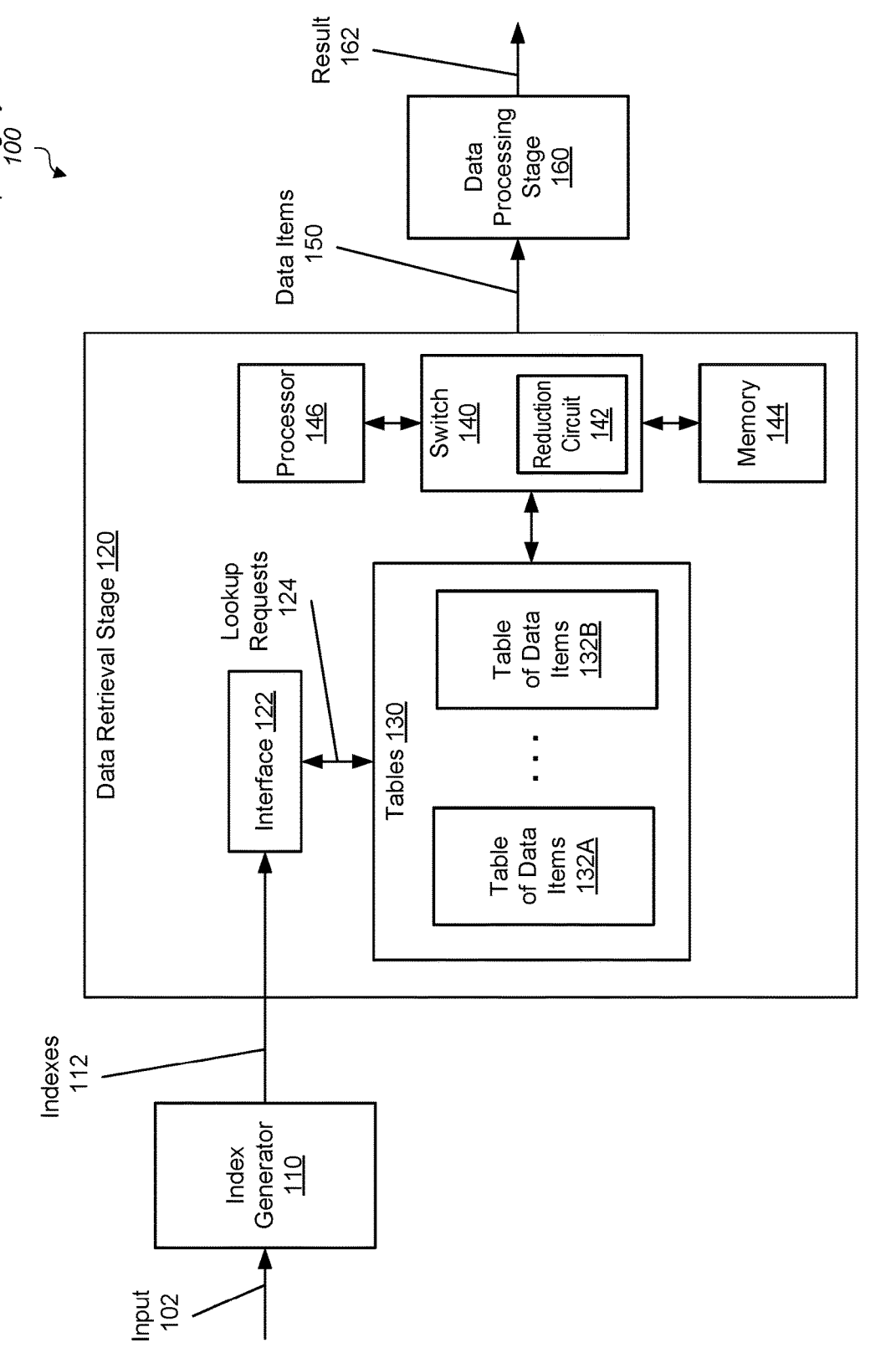
FIG. 1 is a generalized diagram of a computing system that reduces memory bandwidth of executing machine learning models.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods that reduces memory bandwidth of executing machine learning models are contemplated. In various implementations, a computing system includes two or more processing nodes in a multi-node partition. Each of the processing nodes includes at least one or more processors and a corresponding local memory. Switch circuitry (a "switch") of the multi-node partition communicates with at least the local memories and a system memory of the computing system. In various implementations, the switch includes multiple direct memory access (DMA) interfaces. Each of the processing nodes is capable of sending direct memory access (DMA) requests as well as other commands, messages, responses, and tasks to another one of the processing nodes and the switch. Each of one or more processing nodes stores multiple entries of a data array.

In various implementations, the data array is an embedding table used in one of a variety of machine learning models, and the entries are embedding rows. The processing node stores the data array in a local memory of the processing node. A processor of the processing node identifies two or more entries of the data array as source operands of a reduction operation. Examples of the reduction operation are a summing operation, a maximum operation, one of a variety of Boolean logic operations, a mathematical mean or average operation, and so forth. The processor sends the reduction operation to the switch, and the switch executes memory access requests to retrieve data of the two or more entries.

The switch retrieves the data of the two or more entries, and generates a result by performing the reduction operation using the data of the two or more entries. The switch sends the result to the local memory of the processing node. By having the switch perform the reduction operations, rather than any processor of the processing node, the switch reduces memory bandwidth requirements and reduces power consumption of the multi-node partition. The processor is able to perform other tasks while the switch performs memory accesses and executes the reduction operation. The processor is also able to perform memory accesses of the local memory using a separate link or bus than what is used between the switch and the local memory. In some implementations, any combination of a reduction operation and a collective communication operation (data transfer operation) are fused into a single, combined operation that performs the steps of the separate operations used to create the single, combined operation. With such a fused operation, one or more results generated by the switch are sent to a processor other than the one from which the input data arrays were loaded. The fused operation reduces data movement between local memories of separate processors, which reduces memory bandwidth, reduces power consumption, and reduces latency. Further details of these techniques that reduces memory bandwidth of executing machine learning models are provided in the following description of FIGS. 1-6.

Turning now to FIG. 1, a generalized diagram is shown of a computing system 100 that reduces memory bandwidth of executing machine learning models. The computing system 100 includes an index generator 110, a data retrieval stage 120, and a data processing stage 160 that combine to process a workload. The workload includes sparse accesses of data items stored in the tables of data items 132A-132B (or tables 132A-132B). The workload receives an input 102, and the data processing stage 160 generates a result 162 based on multiple, sparsely located data items targeted by the lookup requests 124. In various implementations, the circuitry of the processor 146 or another processor that is not shown performs the functionality of the index generator 110, data retrieval stage 120, and a data processing stage 160. One example of the input 102 is a user query that includes a user identifier (ID) and a movie title that has a corresponding item ID, and the result 162 is a selection (mouse click) probability on another movie title present on a web page. Multiple other examples are also possible and contemplated. The data item represents a unit of data on which the data processing stage 160 operates in initial data processing steps. In some implementations, the index generator 110, the data retrieval stage 120, and the data processing stage 160 combine to form a multilayer network (or data model). The multilayer network classifies data in order to provide an output, such as the result 162, that represents a prediction when given the indexes 112 generated from the input 102.

In various implementations, the functionality of one or more of the index generator 110, the interface 122, the switch 140, and the data processing stage 160 are implemented on an integrated circuit. Examples of the integrated circuit are a central processing unit (CPU), a processor core of a CPU, an application specific integrated circuit (ASIC), a graphics processing unit (GPU), a field programmable gate array (FPGA), or other. In other implementations, the functionality of one or more of the index generator 110, the interface 122, the switch 140, and the data processing stage 160 are implemented on separate integrated circuits such as the processor 146, different processor cores of a processor, such as processor 146, different semiconductor dies on a system on a chip (SoC), a multichip module (MCM), or other.

The index generator 110 receives the input 102 and generates one or more indexes 112. An index of the indexes 112 identifies a particular entry of a particular table of the tables 132A-132B. Although two tables 132A-132B are shown, any number of tables storing data items are possible and contemplated. The interface 122 generates one or more lookup requests 124 based on the indexes 112. The multiple data items targeted by the lookup requests 124 are sparsely located across the entries of one or more of the tables 132A-132B. Therefore, although data items can be stored in a contiguous manner in the tables 132A-132B, the targeted data items are typically stored in a non-contiguous manner in one or more of the tables 132A-132B.

In an implementation, the tables 130 are stored in lower-level memory such as a lower-level cache (e.g., a Level-three (L3) cache), a local node memory implemented by one of a variety of types of dynamic random-access memory (DRAM), a system memory implemented by one of the variety of types of DRAM, disk storage, or remote memory accessed via a network. The memory 144 is one of these types of lower-level memory. The switch 140 includes circuitry for routing packets between one or more sources and one or more destinations. In some implementations, the switch 140 is used within a communication fabric. In various implementation, the packets include memory access requests targeting data stored in the memory 144, the processor 146, or another processor (not shown). The switch 140 also transfers packets between processors such as at least with the processor 146. The switch 140 includes one or more direct memory access (DMA) circuits to perform data transfers.

In one example, the input 102 is a user query that includes a user identifier (ID) and an identifier of a particular type of webpage of a social media website, and the result 162 is a selection (mouse click) probability on a web link of a news post or another user's profile presented on the web page. Another example of the input 102 is an image file ID of an image file with an image to recognize, and the result 162 is an indication of the contents of the image such as a dog, a particular type of vehicle, or other. The multilayer network can be used in a variety of applications such as one of a variety of recommendation models. In an implementation, the data item is a vector of weights with a known length that is operated on by a first hidden layer of a multilayer network where the first hidden layer is an initial data processing step of the data processing stage 160. In other implementations, the index generator 110, the data retrieval stage 120, and the data processing stage 160 combine to process other types of workloads that still use sparse lookup operations of data items.

The index generator 110 receives the input 102 and generates one or more indexes 112. In some implementations, an index of the indexes 112 includes a table identifier. In other implementations, an index of the indexes 112 includes an identifier that is mapped to a table identifier by the interface 122. The table identifier identifies one of the tables 132A-132B of the tables 130. Additionally, an index of the indexes 112 identifies a particular entry of an identified table. The interface 122 uses these identifiers when generating the lookup requests 124. In one case of multiple cases that the computing system 100 is a recommendation system, the input 102 is a user query and the indexes 112 are categorical, sparse input features identifiers.

The indexes 112 are generated from the categorical, sparse input features of the input 102, such as a user query at a website. For each of the features of the categorical, sparse input features, a corresponding entry (or row) of one of the tables 132A-132B is identified by one of the indexes 112. Each entry (or row) of the tables 132A-132B includes a vector of weights, which is referred as an "embedding row." In such designs, the tables 132A-132B are referred to as "embedding tables." Therefore, the sparse encoded input vectors, which are the indexes 112, are transformed into multiple vectors of weights (multiple embedding rows) by the lookup operations performed on the tables 132A-132B.

The lookup operations performed by the data retrieval stage 120 are sparse lookup operations. In an example, an online music business uses a recommendation system, such as the computing system 100, that utilizes a multilayer network to send recommendations of songs to the user. The online music business can provide millions of songs available for access, but the individual user has accessed and possibly ranked only hundreds of songs. Therefore, the interaction between the individual user and the available songs is sparse. Accordingly, the categorical, sparse input features identifiers cause irregular memory accesses of the tables 132A-132B.

To generate the data items 150, one or more reduction operations are performed on the embedding rows that are read out from the tables 132A-132B. These reduction operations are also referred to as "pooling operations" and "embedding bag operations." Examples of the reduction operations are a summing operation, a maximum operation, a mathematical mean or average operation, one of a variety of Boolean logic operations, and so forth. Rather than have a processor perform the reduction operations on the retrieved embedding rows, such as the processor 146, the switch 140 includes the reduction circuit 142 that performs the reduction operations on the retrieved embedding rows.

As described earlier, the switch 140 includes circuitry that routes packets. In addition to routing packets with this circuitry, the switch 140 also includes the reduction circuit 142. Therefore, the switch 140 is able to perform a variety of types of collective communication operations. The collective communication operations include operations such as sending a single data item from one process executed by a first processor to one or more other processes executed by one or more other processors, gathering data from multiple processes executed by multiple processors, and so forth. In various implementations, reduction operations (pooling operations or embedding bag operations) and various types of the collective communication operations have the syntax and semantics of point-to-point operations. These operations typically involve one or more senders (sources) and one or more receivers (destinations). Due to being able to perform other operations besides routing packets between a source and a destination, the switch 140 can also be referred to as a "smart switch 140" or a "compute switch 140."

Due to the large data sizes of the embedding rows and the large number of embedding rows in the tables 132A-132B, large portions of the tables 132A-132B are stored in lower-level memory such as memory 144. In other implementations, one or more of the tables 132A-132B (or portions of the tables 132A-132B) are stored in remote memory located across a network. Due to the irregular memory accesses performed on the tables 132A-132B, and the large data sizes of the embedding rows and the tables 132A-132B, the reduction operations become memory bandwidth limited when a processor performs the reduction operations. In contrast, the reduction circuit 142 reduces memory bandwidth requirements and reduces power consumption by performing the reduction operations as part of the retrieval of the requested embedding rows.

Before providing further details of the reduction circuit 142, a further description of the computing system 100 is provided. The tables 132A-132B store data using one of a variety of static random-access memories and/or one of a variety of dynamic random-access memories. Copies of the tables 132A-132B are located in one or more of local memories of processing nodes, a system memory, and/or a remote memory accessed via a network. The interface 122 includes queues for storing requests and responses as well as circuitry for generating the lookup requests 124, scheduling issue of the lookup requests 124 to the tables 132A-132B, and scheduling issue of the responses to the data processing stage 160. In another implementation, another interface (not shown) is used between the tables 132A-132B and the data processing stage 160, which schedules issue of the responses of the lookup requests 124 to the data processing stage 160 and supports any communication protocol with the data processing stage 160. The circuitry of the interface 122 also supports particular communication protocols used to communicate with the tables 132A-132B and any network.

In addition to including the reduction circuit 142, the switch 140 includes queues for storing requests and responses, arbitration circuitry, programmable configuration registers for storing thresholds and other values, and circuitry for supporting communication protocols with the memory 144, any network, and one or more processors. The recommendation system, such as computing system 100, uses both the categorical, sparse input features identifiers and continuous, dense input features identifiers (not shown). Examples of categorical, sparse input features are a type of user's computing device, a user's preference of a genre of content (e.g., movie, song, clothing), a user's provided ranking of content, other users' rankings of similar content, and so on. Examples of continuous, dense input features are user profile information such as a user's age, an event data and time, a ticket price, and so on. The continuous, dense, input features (not shown) of the input 102 bypass the tables 132A-132B, and are sent to the data processing stage 160 as another input (not shown).

The recommendation system, such as computing system 100, uses the data processing stage 160 to combine the transformed continuous, dense input features (not shown) with the data items 150. The data processing stage 160 combines the received inputs, performs further data processing, and generates the result 162. In such a case, the result 162 is a predicted click-through rate (CTR). The click-through rate prediction provides a likelihood that a user clicks on a web page link indicating particular content such as an advertisement, a recommended song or movie, a recommended article of clothing, an appliance, or other. Although the switch 140 is shown being used in a recommendation system, in other implementations, the switch 140 is used in other systems such as other types of a deep learning recommendation model (DLRM), natural language processing (NLP) applications, sentiment analysis models, graph neural networks, and so forth. In each of these implementations, the reduction circuit 142 of the switch 140 performs reduction operations, which offloads another processor from performing the reduction operations. Therefore, in each of these implementations, the switch 140 reduces the memory bandwidth requirements and the power consumption of the corresponding system.

Figure 2:
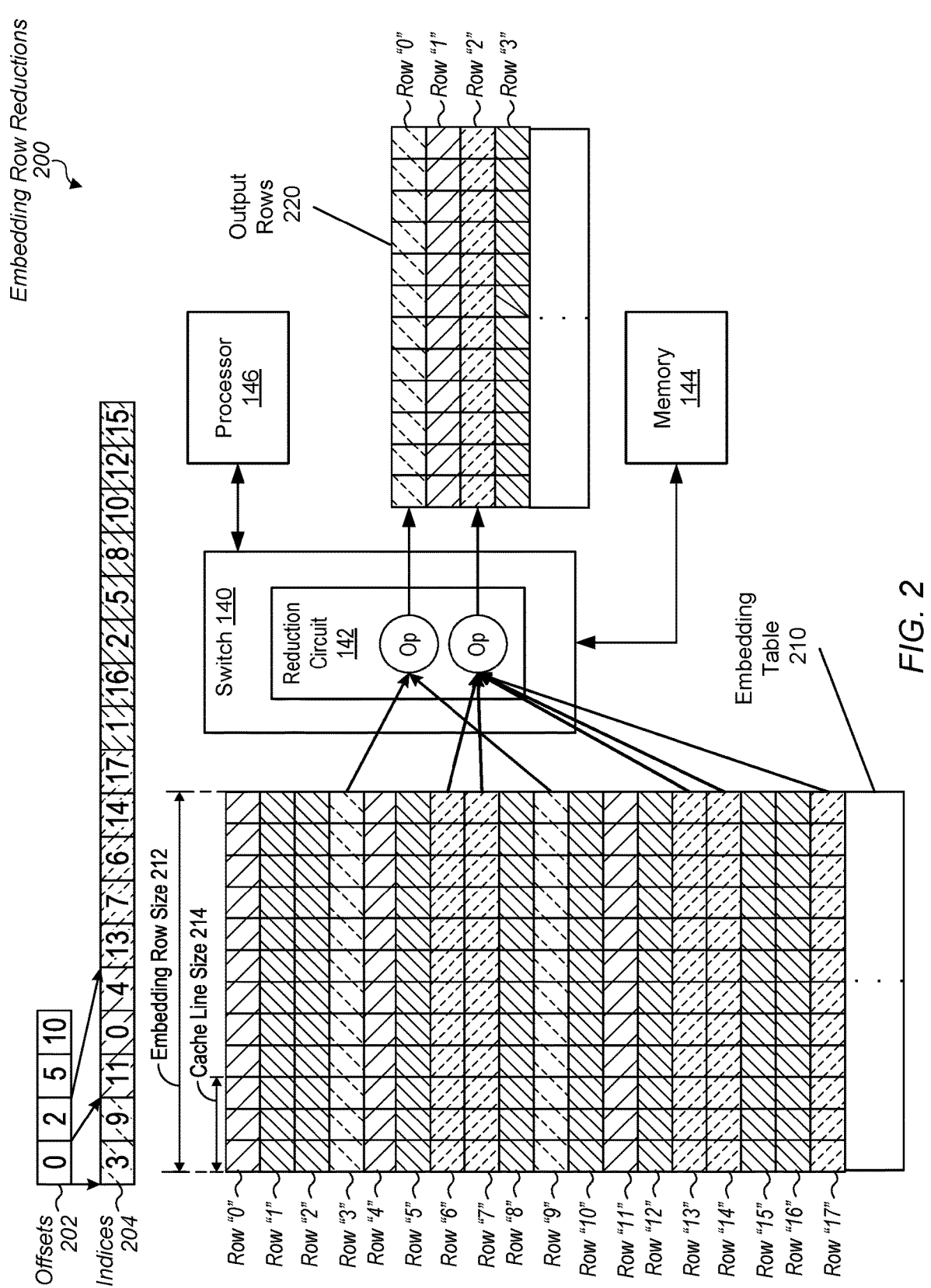
FIG. 2 is a generalized diagram of embedding row reductions that reduces memory bandwidth of executing machine learning models.

Turning now to FIG. 2, a generalized diagram is shown of embedding row reductions 200 that reduces memory bandwidth of executing machine learning models. Circuitry described earlier is numbered identically. As shown, the embedding table 210 includes multiple embedding rows, each with an embedding row size 212. The embedding row size 212 includes the data of multiple cache lines with each cache line having a cache line size 214 of a corresponding computing system. The switch 140 is able to transfer packets that include memory access requests to each of the memory 144 and the processor 146. The reduction circuit 142 of the switch 140 is able to generate a row of the output rows 220 based on a particular reduction operation performed on multiple embedding rows of the embedding table 210. In various implementations, the embedding table 210 is used in one of a variety of types of machine learning (ML) models.

The embedding rows of the embedding table 210 are also referred to as the entries of the embedding table 210 or the embedding vectors of the embedding table 210. Therefore, the embedding row size 212 can also be referred to as the embedding vector size. In some implementations, each of the embedding rows of the embedding table 210 include a particular number of elements, and these elements can also be referred to as dimensions. Each element (or dimension) includes a precision. In implementation, When the number of elements (or number of dimensions) is 192 and the precision is a 32-bit floating-point data format, the embedding row size 212 is 192 dimensions×4 bytes, or 768 bytes. If the cache line size 214 is 64 bytes, then the embedding row size 212 includes 12 cache lines. In other implementations, the sizes of the embedding row size 212 and the cache line size 214 have other values based on design requirements.

The rows of the output rows 220 can be referred to as entries of the output rows 220. The reduction circuit 142 of the switch 140 is able to generate a row of the output rows 220 based on a particular reduction operation (or pooling operation) performed on multiple embedding rows of the embedding table 210. The reduction operations (or pooling operations) are indicated as "Op" within the reduction circuit 142. As described earlier, each one of the reduction operations can be one of a summing operation, a maximum operation, one of a variety of Boolean logic operations, and a mathematical mean or average operation, and so forth. By having the reduction circuit 142 of the switch 140 perform the reduction operations, rather than the processor 146 or any other processor, the reduction circuit 142 reduces memory bandwidth requirements and reduces power consumption.

In an implementation, the embedding rows of the embedding table 210 include at least the embedding rows labeled Row "0" to Row "17." In some implementations, each row of the output rows 220 has the same data size as the embedding row size 212. As shown, the rows of the output rows 220 include at least the rows labeled Row "0" to Row "3." Other values of the indices of embedding table 210 and the output rows 220 are possible and contemplated. The reduction circuit 142 receives an indication of the type of reduction operation. In addition to this indication, the reduction circuit 142 receives particular embedding rows of the embedding table 210. Access circuitry (not shown) accesses the embedding table 210, and provides a copy of the particular embedding rows of the embedding table 210 to the reduction circuit 142 based on the offsets 202 and the indices 204.

Each one of the rows of the output rows 220 is computed by the reduction circuit 142 performing a reduction operation using a particular number of embedding rows of the embedding table 210. The offsets 202 indicate this number of embedding rows for the reduction circuit 142 to use, and the indices 204 identify which particular embedding rows of the embedding table 210 to provide to the reduction circuit 142. In an implementation, the offsets 202 includes the values "0" and "2," which indicate a number of 2 embedding rows to use by the reduction circuit 142. In an implementation, each of the elements of the offsets 202 and the indices 204 has a data size that is a byte, although, in other implementations, a different data size is used. The two indices of the indices 204 beginning at an offset of zero include the indices "3" and "9." Therefore, the embedding rows labeled "Row 3" and "Row 9" are read out, by the access circuitry, from the embedding table 210, and provided to the reduction circuit 142. The reduction circuit 142 performs a corresponding reduction operation using the data values of the copies of "Row 3" and "Row 9," and writes the resulting output to the row labeled "Row 0" of the output rows 220.

In a similar manner, the reduction circuit 142 writes resulting data values in other rows of the output rows 220. The next consecutive pair of offsets of the offsets 202 includes the values "2" and "5," which indicate a number of 3 embedding rows to use by the reduction circuit 142. The three indices of the indices 204 beginning at an offset of two include the indices "11," "0," and "4." Therefore, the embedding rows labeled "Row 0," "Row 4," and "Row 11" are read out, by the access circuitry, from the embedding table 210, and provided to the reduction circuit 142. The arrows showing the accesses of the embedding rows labeled "Row 0," "Row 4," and "Row 11" are not shown for ease of illustration. The reduction circuit 142 performs a corresponding reduction operation using the data values of the copies of labeled "Row 0," "Row 4," and "Row 11" and writes the resulting output to the row labeled "Row 1" of the output rows 220.

The next consecutive pair of offsets of the offsets 202 includes the values "5" and "10," which indicate a number of 5 embedding rows to use by the reduction circuit 142. The five indices of the indices 204 beginning at an offset of five include the indices "13," "7," "6," "14," and "17." Therefore, the embedding rows labeled "Row 6," "Row 7," "Row 13," "Row 14," and "Row 17" are read out, by the access circuitry, from the embedding table 210, and provided to the reduction circuit 142. The reduction circuit 142 performs a corresponding reduction operation using the data values of the copies of "Row 6," "Row 7," "Row 13," "Row 14," and "Row 17" and writes the resulting output to the row labeled "Row 2" of the output rows 220. The number of reduction operations performed simultaneously by the reduction circuit 142 varies from implementation to implementation.

In several implementations, the size of the embedding table 210 is too large to fit in a cache of a single processor such as the processor 146. Although a single embedding table is shown in the illustrated implementation, in various implementations, there are a large number, such as thousands, of embedding tables from which to choose embedding rows for a particular reduction operation, the reduction circuit 142. Additionally, the values of the indices 204 identifying one set of embedding rows for one reduction operation can include far distances between another set of embedding rows of a same embedding table identified by other values of the indices 204 for another reduction operation. The required embedding rows can be located in other memory regions and on separate memory devices. Further, the embedding row size 212 can be too large to fit in a single packet being transferred across one or more memory buses and communication fabric buses. Therefore, the reduction operations being performed for a particular machine learning model are memory bandwidth intensive operations.

The switch 140 is one of multiple switches used in a computing system that performs operations for the particular machine learning model that utilizes memory bandwidth intensive operations. The switch 140 (and other switches) performs data fetching operations in the computing system. By having the reduction circuit 142 of the switch 140 perform the reduction operations, rather than the processor 146 or any other processor, the reduction circuit 142 reduces memory bandwidth requirements and reduces power consumption.

Figure 3:
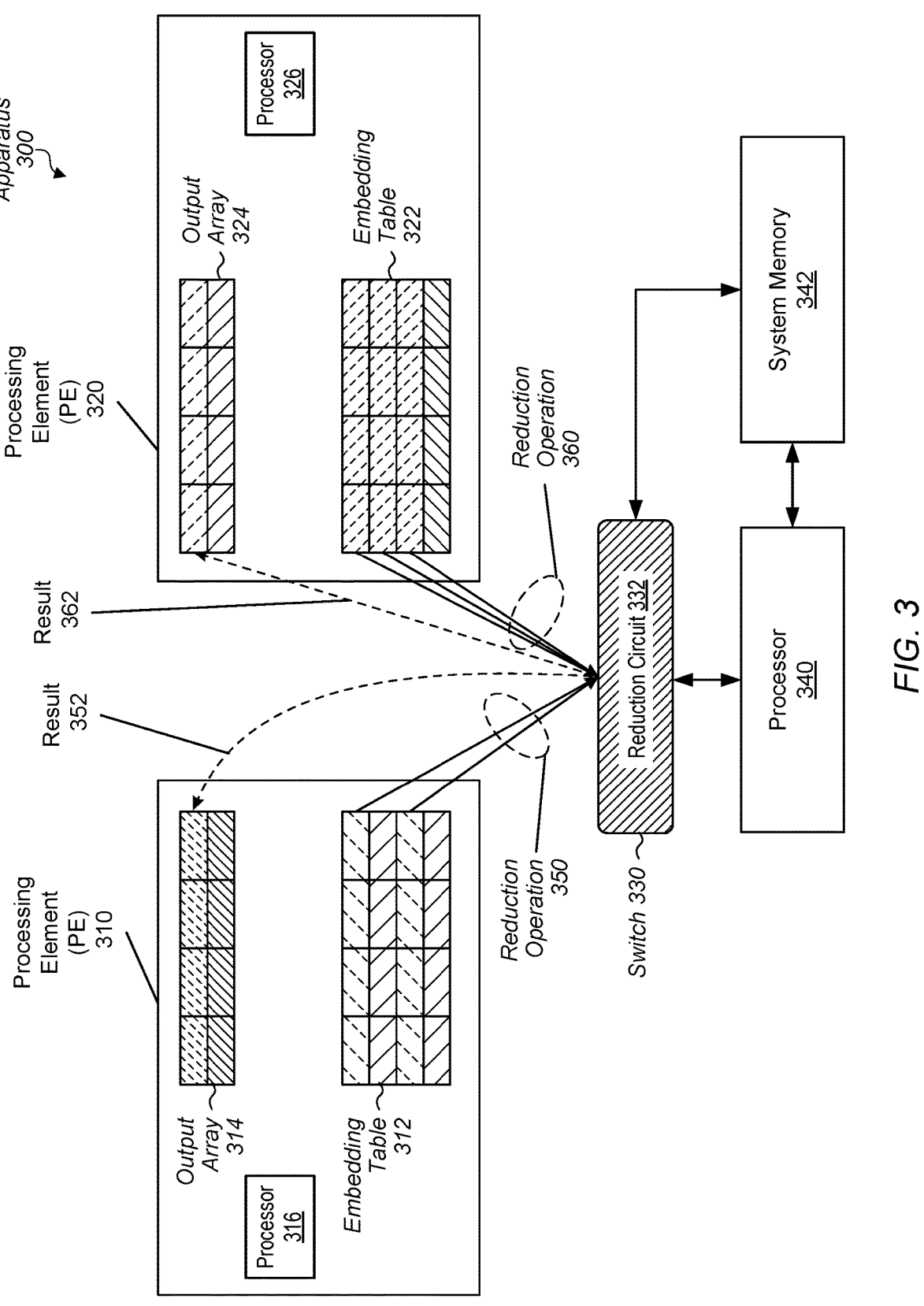
FIG. 3 is a generalized diagram of an apparatus that reduces memory bandwidth of executing machine learning models.

Turning now to FIG. 3, a generalized diagram is shown of an apparatus 300 that reduces memory bandwidth of executing machine learning models. The apparatus 300 includes the processing element 310, the processing element 320, the switch 330, the processor 340, and the system memory 342. The processing element 310 includes hardware such as at least the processor 316 for performing data processing, and a local memory that includes at least the embedding table 312 and the output array 314. Similarly, the processing element 320 includes the processor 326 for performing data processing, and a local memory that includes at least the embedding table 322 and the output array 324. The switch 330 includes circuitry that supports communication between the processing elements 310 and 320, communication with the processor 340, communication with the system memory 342, and communication with any remote memory via a network (not shown).

Power controllers, interrupt controllers, phased locked loops (PLLs) or other clock generating circuitry, and so forth are not shown in the apparatus 300 for ease of illustration. In some implementations, the functionality of the apparatus 300 is implemented on a single integrated circuit. In other implementations, the functionality of the apparatus 300 is implemented on separate integrated circuits on a system on a chip (SoC), a multichip module (MCM), or other. In an implementation, the processor 316 of the processing element 310 is a processor with a highly parallel data microarchitecture such as a graphics processing unit (GPU), and the local memory is off-chip memory such as one of a variety of types of synchronous random-access memory (SRAM). In some implementations, the circuitry of the processor 316 includes a local memory controller that supports one of a variety of types of a Graphics Double Data Rate (GDDR) communication protocol. In various implementations, the components of the processing element 320 are an instantiation of the components of the processing element 310.

In some implementations, the apparatus 300 includes the processor 340 as a host processor that assigns tasks to processing nodes of a multi-node partition where the apparatus 300 is the multi-node partition and the processing elements 310 and 320 are the processing nodes. The processing nodes include at least one or more processors and local memory such as the processor 316 of the processing element 310 and a local memory that stores the embedding table 312 and the output array 314. In an implementation, the host processor 340 is a general-purpose central processing unit (CPU) and the processor 316 is a highly parallel data processor such as graphics processing unit (GPU).

In some implementations, the processing nodes, which can be implemented by processing elements 310 and 320, are non-uniform memory access (NUMA) processing nodes utilizing GPUs to process parallel data tasks. For example, the processing nodes execute tasks for machine learning applications. Compilers extract parallelized tasks from program code to execute in parallel on the system hardware. In an implementation, the processing nodes are expansion cards inserted in an expansion socket or slot on a motherboard. In other implementations, the processing nodes are integrated circuits placed on a same expansion card in a slot or soldered on the motherboard. For example, the apparatus 300 is a multi-node partition that is a MCM placed in a socket of a multi-socket motherboard in a desktop computer or a server. In other implementations, one or more of the processors 316, 326 and 340 is one of a variety of types of an application specific integrated circuit (ASIC), a field programmable gate array (FPGA), and so forth. The memory 340 is a system memory implemented by one of the variety of types of dynamic random-access memory (DRAM), disk storage, or remote memory accessed via a network.

The switch 330 includes circuitry for routing packets between a source and a destination. In some implementations, the switch 330 is used within a communication fabric, and the switch 330 includes circuitry that performs collective communication operations. In various implementation, the packets include memory access requests targeting data stored in one or more of the processing element 310, the processing element 320, and the memory 340. In addition, the switch 330 includes the reduction circuit 332 that performs one of a variety of reduction operations (pooling operations or embedding bag operations). Therefore, in various implementations, the reduction circuit 332 includes the functionality of the reduction circuit 142 (of FIGS. 1-2) and the switch 330 has the functionality of the switch 140 (of FIGS. 1-2).

The processing element 310 stores (or is assigned) at least a portion of the embedding table 312 and the output array 314. The processing element 320 stores (or is assigned) at least a portion of the embedding table 322 and the output array 324. In addition to a local cache memory subsystem (not shown) of the processors 316 and 326, each of the processing elements 310 and 320 includes a local memory that is off-chip memory such as one of a variety of types of synchronous random-access memory supported by a communication protocol such as one of a variety of types of a Graphics Double Data Rate (GDDR) communication protocol. These local memories of the processing elements 310 and 320 store copies of the embedding tables 312 and 322 and the output arrays 314 and 324.

In an implementation, a first reduction operation is a direct memory access (DMA) packet that has a header that stores information such as an identifier (ID) of one or more of the processor 316 and the processing element 310, multiple starting addresses corresponding to a local memory of the processing element 310 that stores the multiple particular embedding rows of the embedding table 312 to use in the reduction operation, a data size of elements, such as a data size of an embedding row of the embedding table 312, and a destination address corresponding to the local memory of the processing element 310 that stores the output array 314. A second reduction operation includes similar information, but the identifiers and addresses correspond to the processing element 320. It is also noted that although two processing elements 310 and 320 are shown in the apparatus 300, another number of processing elements are used based on design requirements in other implementations. Therefore, the DMA packet is modified to support any number of sources and destinations for the reduction operation being performed by the switch 330.

In addition, the reduction operation includes one or more indications that include information similar to the offsets 202 and the indices 204 (of FIG. 2). The packets, such as DMA packets, are modified to include this information as well as indicate one of a variety of types of reduction operations, and to either perform the reduction operation with embedding rows from an embedding table of a single processor, or perform the reduction operation with embedding rows from separate embedding tables of separate processors. In some implementations, the interface circuitry of the switch 330, and the processing elements 310 and 320 supports a communication protocol such as the xGMI (inter-chip global memory interconnect) for GPU-to-GPU interconnections from Advanced Micro Devices, Inc. However, in other implementations, other types of communication protocols are possible and contemplated.

In an implementation, a bus on the motherboard of the apparatus 300 uses a communication protocol such as PCIe (Peripheral Component Interconnect Express), Infinity Fabric from Advanced Micro Devices, Inc., and Infinity Architecture from Advanced Micro Devices, Inc. In an implementation, copies of the embedding tables 312 and 322 are stored in one or more of a system memory, such as memory 340, and another processor (not shown), such as a CPU. In an implementation, each of the processors 316 and 326 is a GPU, and at least portions of the embedding tables 312 and 322 can fit in the local memories of the processing elements 310 and 320. The combination of offloading the reduction operation from the processors 316 and 326 to the switch 330, and transferring data between the switch 330 and the local memories of the processing elements 310 and 320 using dedicated point-to-point interconnections, such as inter-chip interconnections (e.g., xGMI interconnections), reduces the memory bandwidth requirement and power consumption of the apparatus 300. The processors 316 and 326 are able to perform other tasks while the switch 330 performs memory accesses and executes the reduction operation. The processors 316 and 326 are also able to perform memory accesses of the corresponding local memories using a separate link or bus than what is used between the switch 330 and the local memories.

In one implementation, an entire reduction operation, such as an embedding bag operation, is offloaded from the processors 316 and 326 to the switch 330. As shown, the switch 330 receives particular embedding rows of the embedding table 312, the reduction circuit 332 performs the reduction operation 350 on these received embedding rows to generate the result 352, and sends the result 352 to the output array 314. Similarly, the switch 330 receives particular embedding rows of the embedding table 322, the reduction circuit 332 performs the reduction operation 360 on these received embedding rows to generate the result 362, and sends the result 362 to the output array 324. It is noted that although a single reduction operation is shown, such as reduction operation 350, in other implementations, the generation of the result 352 is performed by multiple reduction operations with each operating on data elements of particular portions of multiple embedded rows, rather than entirely of the multiple embedded rows. Similarly, the generation of the result 362 is performed by multiple reduction operations, rather than a single operation.

It is also noted that although a particular number of embedded rows and a particular number of data elements in each embedded row is shown for the embedding tables 312 and 322 and output arrays 314 and 324, it is possible and contemplated that other numbers of embedded rows and data elements are used in other implementations. In another implementation, the reduction operation is partially offloaded to the switch 330 such that the switch 330 performs the reduction operations that generates a portion of the results of the output array 314 while the processor 316 performs the reduction operations that generates another portion of the results of the output array 314. Similarly, the processor 326 performs the reduction operations that generates a portion of the results of the output array 324. At least portions of one or more of the output arrays 314 and 324 are also stored in system memory such as memory 340.

Figure 4:
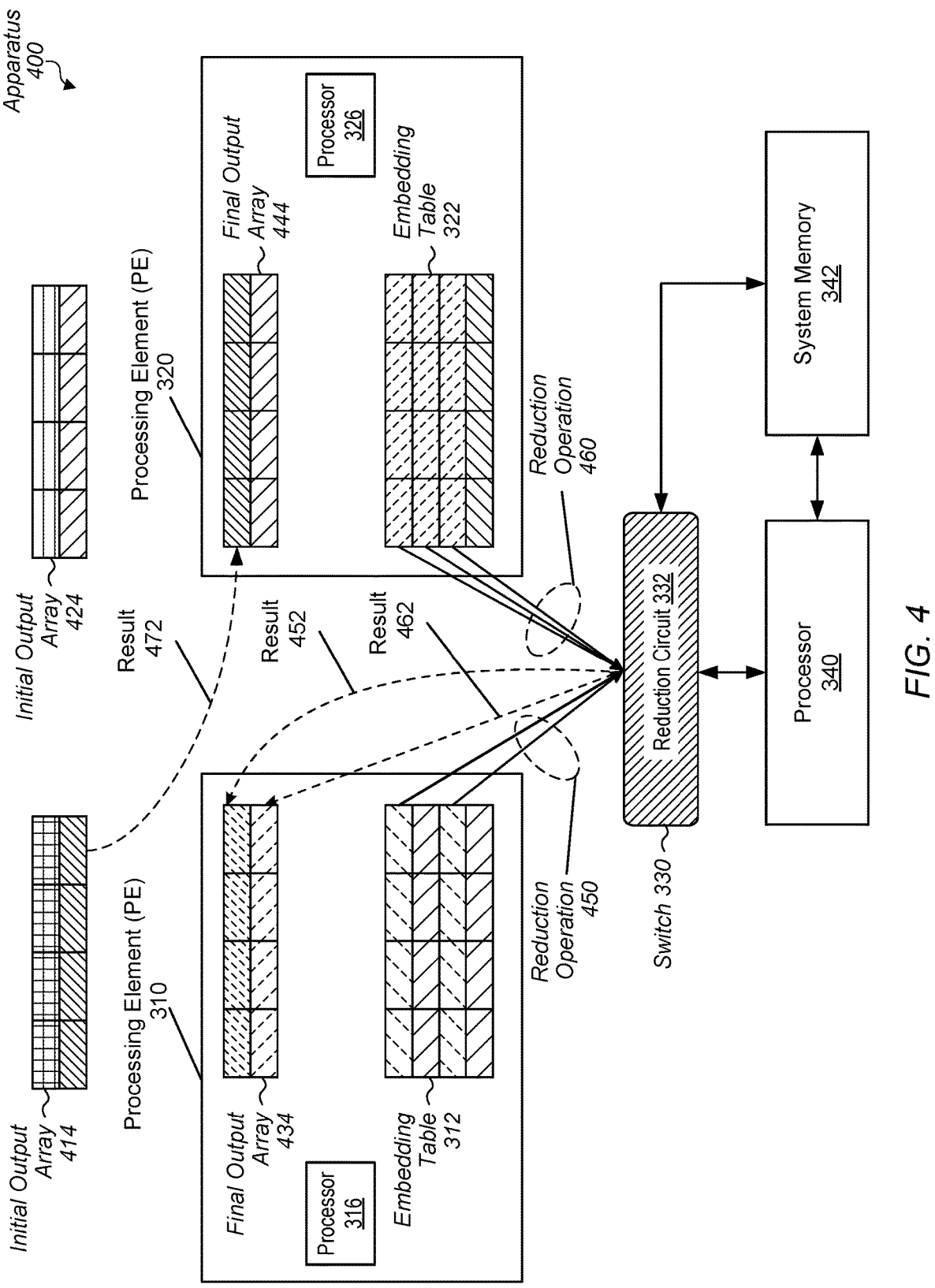
FIG. 4 is a generalized diagram of an apparatus that reduces memory bandwidth of executing machine learning models.

Referring to FIG. 4, a generalized diagram is shown of an apparatus 400 that reduces memory bandwidth of executing machine learning models. Circuitry and data structures described earlier are numbered identically. Here, the initial output arrays 414 and 424 are shown above the processing elements 310 and 320. The initial output arrays 414 and 424 store the data values of output arrays prior to execution of the reduction operations 450 and 460 and a collective communication operation. The final output arrays 434 and 444 store data values after the execution of the reduction operations 450 and 460, and the execution of one or more collective communication operations that transfer data between the processing elements 310 and 320. One example of a collective communication operation (data transfer operation) is an operation that that sends a copy of data of the bottom row of the initial output array 414 to the top row of the final output array 444.

An initial description of the execution of a collective communication operation (data transfer operation) followed by a separate reduction operation is provided. Afterward, a description of a fused operation that performs the steps of these two separate operations is provided. Compared to performing the collective communication operation and the reduction operation separately, the fused operation reduces memory bandwidth, reduces power consumption, and reduces latency. When separately executing a first collective communication operation (data transfer operation) followed by the separate reduction operation, the switch 330 performs the first collective communication operation that transfers a copy of the data of the bottom row of the initial output array 414 to the top row of the final output array 444. This copy of the data of the bottom row of the initial output array 414 is shown as result 472. Following, the reduction circuit 332 performs the two reduction operations 450 and 460. Without performing a fused operation, the switch 330 stores the result 462 in the processing element 320. Afterward, the switch 330 performs a second collective communication operation to transfer the result 462 from the processing element 320 to the bottom row of the final output array 434 of the processing element 310. It is noted that although the terms "left," "right," "horizontal," "vertical," "row," "column," "top," and "bottom" can be used to describe the apparatus 400 (and the apparatus 300 of FIG. 3), the meaning of the terms can change as the apparatus 400 is rotated or flipped.

In various implementations, any combination of a reduction operation and a collective communication operation are fused into a single, combined operation that performs the steps of the separate operations used to create the single, combined operation. The single, combined operation (fused operation) transfers the result 472 from the processing element 310 to the processing element 320 during the data retrieval stage that retrieves source data for one or more reduction operations of the combined operation. The single, combined operation (fused operation) also directly writes results 452 and 462 from the switch 330 to the final output array 434 without a data transfer of result data between the processing elements 310 and 320. Such an implementation removes a latency overhead associated with a data transfer of result data between the processing elements 310 and 320, reduces data movement to the memory 340, and reduces power consumption.

During execution of the fuse operation, the switch 330 retrieves data of particular embedding rows of the embedding table 312, particular data of the initial output array 414, and data of particular embedding rows of the embedding table 322. For this fuse operation, the switch 330 retrieves copies of the data of two rows of the embedding table 312 of the processing element 310. Additionally, the switch 330 retrieves copies of the data of three rows of the embedding table 322 of the processing element 320. Additionally, the switch 330 retrieves a copy of the data of the bottom row of the initial output array 414. Afterward, the switch 330 transfers a copy of the retrieved data of the bottom row of the initial output array 414, which is indicated as result 472, to the top row of the final output array 444.

The reduction circuit 332 performs the reduction operation 450 on the two retrieved embedding rows from the embedding table 312 to generate the result 452. The reduction circuit 332 also performs the reduction operation 460 on the three retrieved embedding rows from the embedding table 322 to generate the result 462. In various implementations, the reduction circuit 332 writes the result 452 directly to the top row of the final output array 434 and writes the result 462 directly to the bottom row of the final output array 434. By retrieving source data for multiple operations during a single data retrieval and data transfer stage, and writing result data directly to an output array of any of the available processing elements (e.g., final output array 434 of the processing element 310) even when source data of embedding rows are stored in another processing element, the fused operation reduces memory bandwidth, reduces power consumption, and reduces latency.

In an implementation, a first combined (fused) operation is a direct memory access (DMA) packet that has a header that stores information such as a source identifier (ID) of one or more of the processor 316 and the processing element 310, one or more starting addresses corresponding to a local memory of the processing element 310 that stores one or more entries (embedding rows) of the embedding table 312 to move to a local memory of the processing element 320, a data size of elements, such as a data size of an embedding row of the embedding table 312, one or more destination addresses corresponding to the local memory of the processing element 320 that stores the moved one or more embedding rows, a destination identifier (ID) that identifies the processing element 320, and information corresponding to the reduction operation of the first combined (fused) operation. A second combined (fused) operation includes similar information, but the sources and destinations can change from the values used for the first combined (fused) operation.

Referring to FIG. 5, a generalized diagram is shown of a method 500 that reduces memory bandwidth of executing machine learning models. For purposes of discussion, the steps in this implementation (as well as in FIG. 6) are shown in sequential order. However, in other implementations some steps occur in a different order than shown, some steps are performed concurrently, some steps are combined with other steps, and some steps are absent.

Two or more processing nodes are placed in a multi-node partition of a computing system. Each of the processing nodes includes at least one or more processors and local memory. A switch of the multi-node partition communicates with at least the local memories and a system memory of the computing system. Tasks are assigned to the partition by a host processor or by the processing nodes themselves. Each of the processing nodes is capable of sending direct memory access (DMA) requests as well as other commands, messages, responses, and tasks to another one of the processing nodes and the switch. Each of one or more processing nodes stores multiple entries of a data array (block 502).

In various implementations, the data array is an embedding table used in one of a variety of machine learning models, and the entries are embedding rows. The processing node stores the data array in a local memory of the processing node. A processor of the processing node identifies two or more entries of the data array as source operands of a reduction operation (block 504). Examples of the reduction operation are a summing operation, a maximum operation, one of a variety of Boolean logic operations, a mathematical mean or average operation, and so forth. The processor sends the reduction operation to the switch, and the switch executes memory access requests to retrieve data of the two or more entries (block 506).

The switch retrieves the data of the two or more entries (block 508). The switch generates a result by performing the reduction operation using the data of the two or more entries (block 510). The switch sends the result to the local memory of the processing node (block 512). By having the switch perform the reduction operations, rather than any processor of the processing node, the switch reduces memory bandwidth requirements and reduces power consumption of the multi-node partition. The processor is able to perform other tasks while the switch performs memory accesses and executes the reduction operation. The processor is also able to perform memory accesses of the local memory using a separate link or bus than what is used between the switch and the local memory.

Turning now to FIG. 6, a generalized diagram is shown of a method 600 that reduces memory bandwidth of executing machine learning models. Two or more processing nodes are placed in a multi-node partition of a computing system. In various implementations, data arrays are embedding tables used in one of a variety of machine learning models, and the entries are embedding rows. Processing nodes store multiple entries of the data arrays in local memories of the processing nodes. A first processing node stores multiple entries of a first data array (block 602). A second processing node stores multiple entries of a second data array (block 604). A processor of the first processing node sends a combined operation (fuse operation) to a switch of the computing system (block 606). In some implementations, the combined operation includes a collective communication operation followed by a reduction operation.

In various implementations, in block 611, the switch performs the steps of blocks 608 and 610 concurrently. The switch transfers data between the first processing node and the second processing node based on the type of combined operation (block 608). The switch also retrieves data of the first data array and the second data array based on the type of combined operation (block 610). In other implementations, the switch performs the steps of block 610 prior to the steps of block 608 based on the type of the combined operation. The switch generates a result, using the retrieved data, by performing a reduction operation indicated by the combined operation (block 612). The switch sends the result directly to one or more of the first processing node and the second processing node (block 614). By retrieving source data for multiple operations during a single data retrieval and data transfer stage, and writing result data directly to an output array of any of the available processing nodes even when source data are stored in another processing node, the combined operation (fused operation) reduces memory bandwidth, reduces power consumption, and reduces latency.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
a switch configured to be coupled to a local memory of a processing node and to a system memory, the switch comprising circuitry configured to:
receive, from the processing node, an indication that identifies a plurality of embedding rows and a reduction operation to be performed on the plurality of embedding rows;
retrieve the plurality of embedding rows from at least one of the system memory, the local memory of the processing node, a local memory of another processing node, or a remote memory;
perform the reduction operation on the plurality of embedding rows to generate a reduced result; and
send the reduced result to the local memory of the processing node.
2. The integrated circuit as recited in claim 1, wherein the plurality of embedding rows are entries of an embedding table of a machine learning model.

3. The integrated circuit as recited in claim 1, wherein in response to receiving a combined operation, the switch is further configured to:
transfer data of an entry of a first data array stored in a first processing node to a second data array stored in a second processing node; and
write, to the entry of the first data array, result data generated by performing a second type of reduction operation using data of the first data array.
4. The integrated circuit as recited in claim 3, wherein in response to receiving a second combined operation, the switch is further configured to:
transfer data of an entry of the second data array to the first data array; and
write, to that entry of the second data array, result data generated by performing a third type of reduction operation using data of the second data array.
5. The integrated circuit as recited in claim 3, wherein the switch is configured to communicate with a local memory of the first processing node using a first communication protocol and to communicate with a local memory of the second processing node using a second, different communication protocol.
6. The integrated circuit as recited in claim 1, wherein the reduction operation comprises one of a summing operation, maximum operation, or averaging operation on the plurality of embedding rows.
7. The integrated circuit as recited in claim 5, wherein a first processor is configured to process tasks and access data stored in the local memory of the first processing node and the local memory of the second processing node while the switch generates the result data.
8. A method comprising:
receiving, by a switch of an integrated circuit and from a processing node coupled to the switch, an indication that identifies a plurality of embedding rows and a reduction operation to be performed on the plurality of embedding rows;
retrieving, by the switch, the plurality of embedding rows from at least one of a system memory, a local memory of the processing node, a local memory of another processing node, or a remote memory;
performing, by the switch, the reduction operation on the plurality of embedding rows to generate a reduced result; and
sending, by the switch, the reduced result to the local memory of the processing node.
9. The method as recited in claim 8, wherein the plurality of embedding rows are entries of an embedding table of a machine learning model.
10. The method as recited in claim 8, wherein in response to receiving a combined operation, the method further comprises:
transferring data of an entry of a first data array stored in a first processing node to a second data array stored in a second processing node; and
writing, to the entry of the first data array, result data generated by performing a second type of reduction operation using data of the first data array.
11. The method as recited in claim 10, wherein in response to receiving a second combined operation, the method further comprises:
transferring data of an entry of the second data array to the first data array; and
writing, to that entry of the second data array, result data generated by performing a third type of reduction operation using data of the second data array.

12. The method as recited in claim 10, wherein the reduction operation comprises one of a summing operation, averaging operation, or a maximum operation.

13. The method as recited in claim 10, further comprising communicating, by the switch, with a local memory of the first processing node using a first communication protocol and communicating with a local memory of the second processing node using a second, different communication protocol.

14. The method as recited in claim 13, further comprising processing tasks, by a first processor, and accessing, by the first processor, data stored in the local memory of the first processing node and the local memory of the second processing node while the switch generates the result data.

15. A computing system comprising:

a first processing node comprising a processor and a local memory storing a plurality of embedding rows of an embedding table; and a switch coupled to the local memory of the processing node and to a system memory accessible by the computing system, the switch comprising circuitry configured to:

receive, from the processor of the processing node, an indication that identifies a subset of the embedding rows and a reduction operation to be performed on the subset of the embedding rows;

retrieve the subset of the embedding rows from at least one of the system memory, the local memory of the processing node, a local memory of another processing node, or a remote memory;

perform the reduction operation on the subset of the embedding rows to generate a reduced result; and send the reduced result to the local memory of the processing node.

16. The computing system as recited in claim 15, wherein the indication further identifies a set of offsets and indices, and wherein the switch is configured to determine the subset of the embedding rows based on the set of offsets and indices.

17. The computing system as recited in claim 15, wherein retrieving the subset of the embedding rows comprises issuing, by the switch, a plurality of direct memory access requests that target non-contiguous memory locations storing respective portions of the embedding rows.

18. The computing system as recited in claim 17, wherein performing the reduction operation comprises performing a plurality of partial reductions on subsets of elements of the embedding rows and combining the partial reductions to generate the reduced result.

19. The computing system as recited in claim 17, wherein the switch is further configured to schedule retrieval of the subset of embedding rows based on programmable thresholds stored in configuration registers of the switch.

20. The computing system as recited in claim 17, wherein the processor is configured to access the local memory using a first communication path while the switch retrieves the subset of the embedding rows using a second communication path different from the first communication path.

* * * * *